Figure 1:
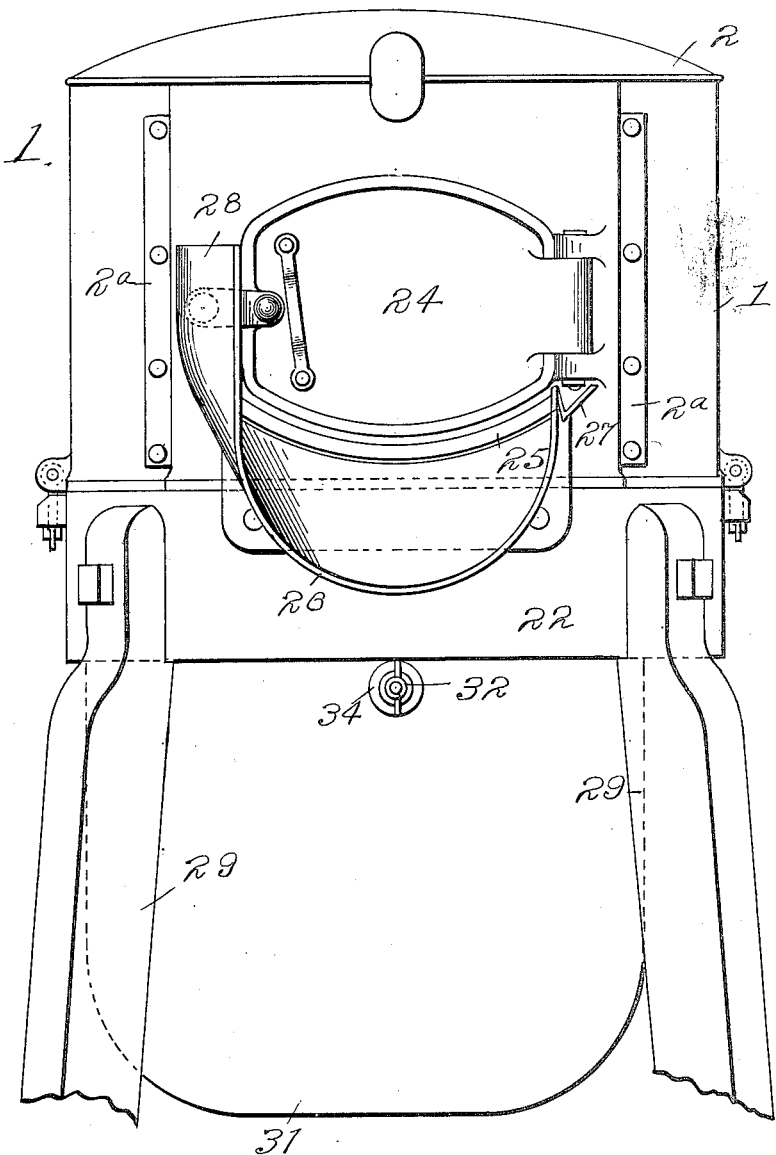

H. ROBINSON.
VEGETABLE PARING MACHINE.
APPLICATION FILED NOV. 12, 1908.

942,932.

Patented Dec. 14, 1909.
8 SHEETS—SHEET 1.

Witnesses:
H. H. Knight
F. M. Ryan

Inventor
Henry Robinson
By his Attorneys

H. ROBINSON.
VEGETABLE PARING MACHINE.
APPLICATION FILED NOV. 12, 1908.
942,932.
Patented Dec. 14, 1909.
8 SHEETS—SHEET 2.
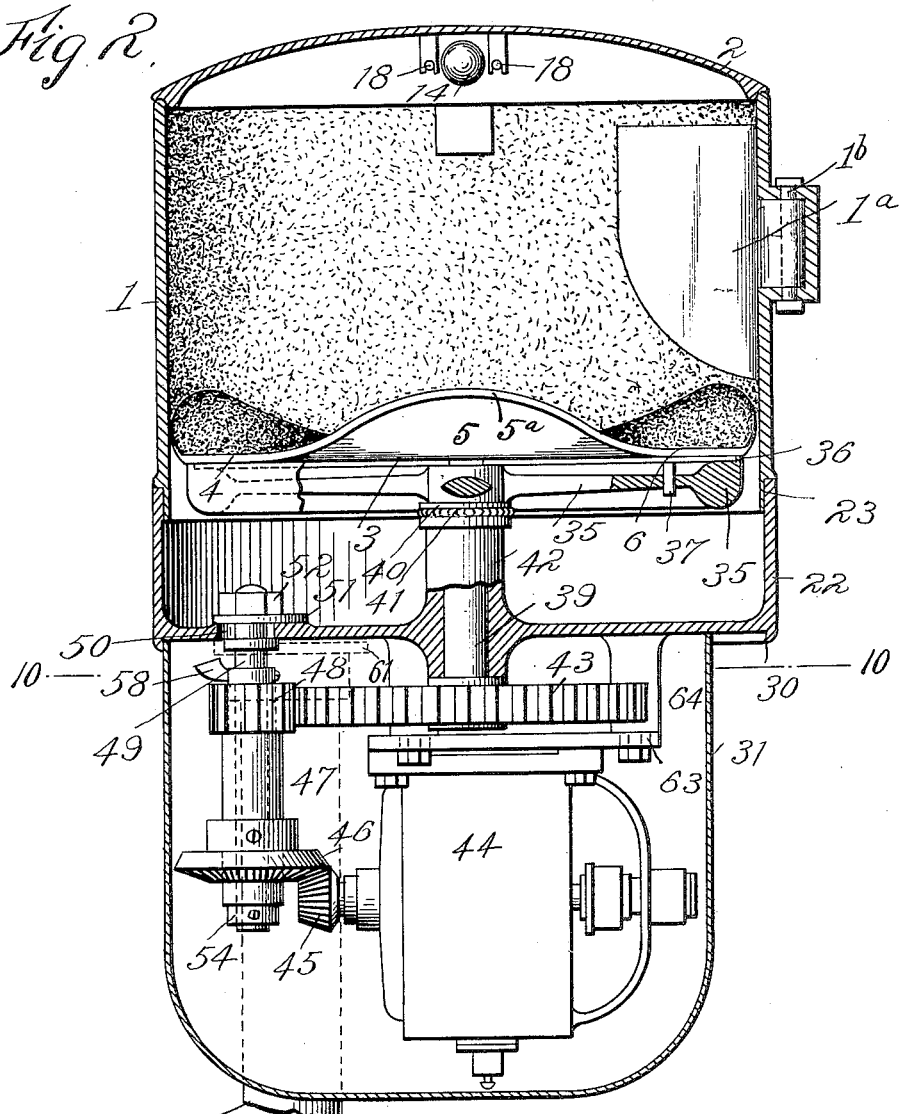
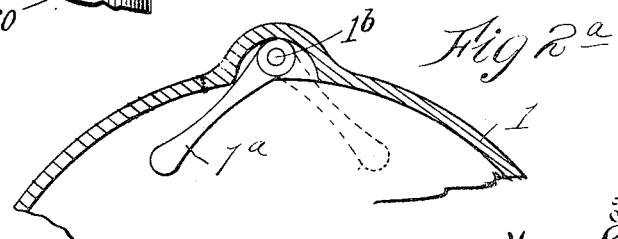
Witnesses:
H H Knight
F. M. Ryan
Inventor
Henry Robinson
By his Attorneys

H. ROBINSON.
VEGETABLE PARING MACHINE.
APPLICATION FILED NOV. 12, 1908.

942,932.

Patented Dec. 14, 1909.
8 SHEETS—SHEET 3.

Witnesses:
H. H. Knight
F. M. Ryan

Inventor
Henry Robinson
By his Attorneys

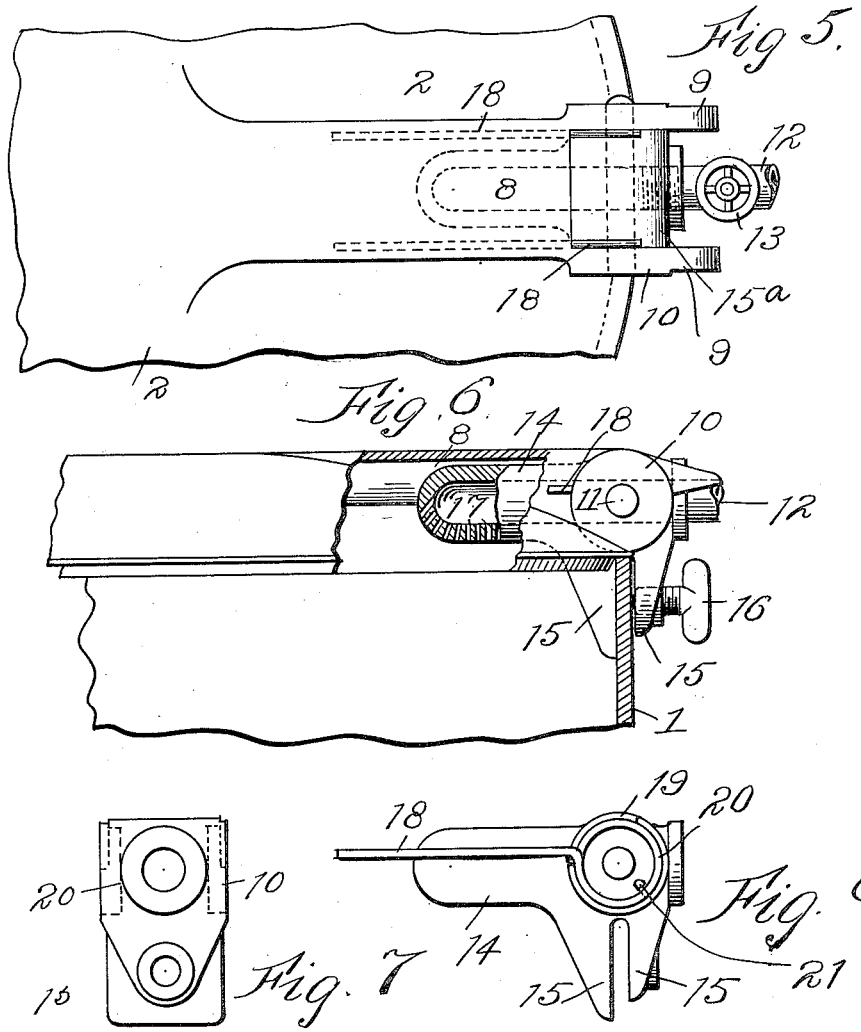

H. ROBINSON.
VEGETABLE PARING MACHINE.
APPLICATION FILED NOV. 12, 1908.
942,932.
Patented Dec. 14, 1909.
8 SHEETS—SHEET 5.
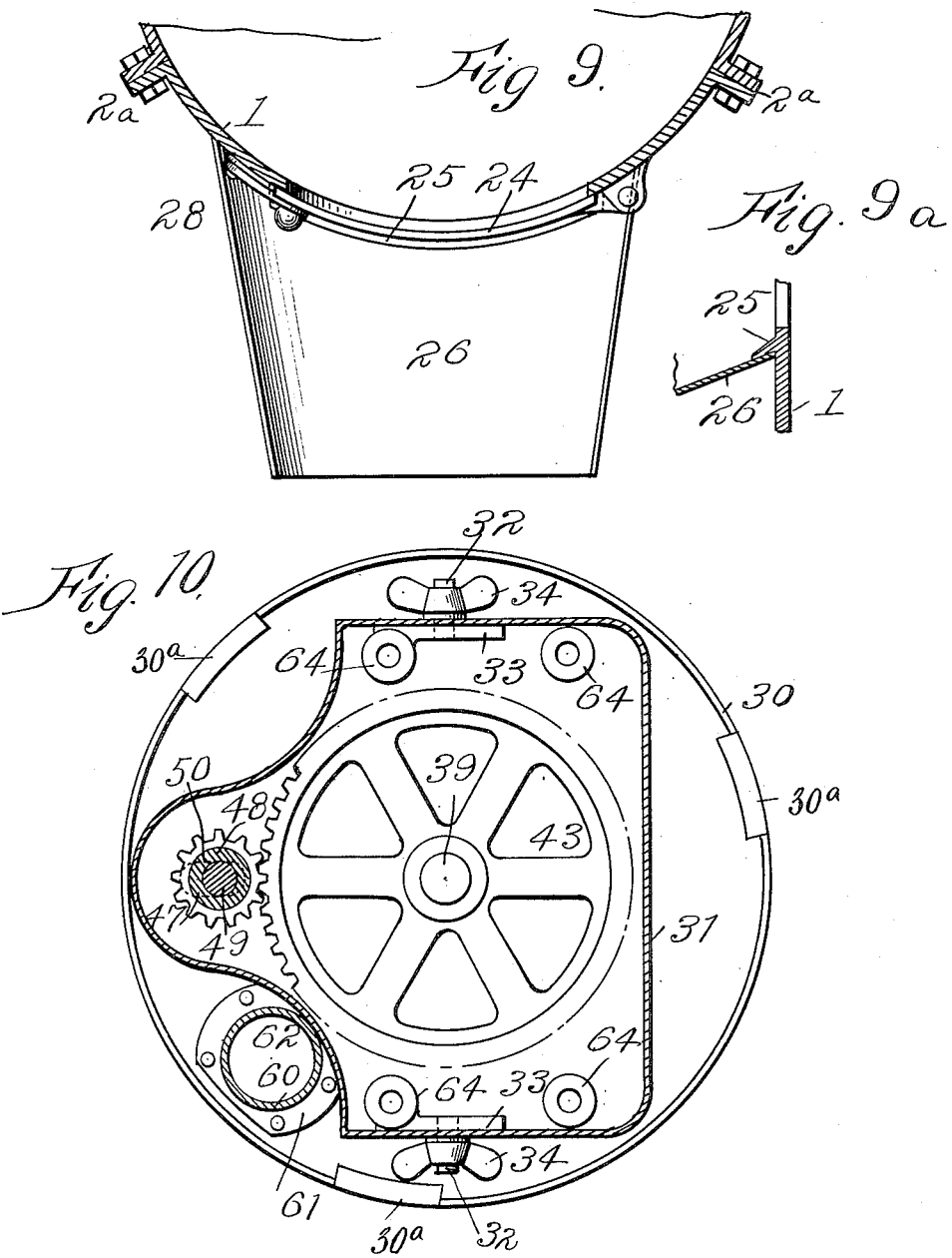

H. ROBINSON.
VEGETABLE PARING MACHINE.
APPLICATION FILED NOV. 12, 1908.

942,932.

Patented Dec. 14, 1909.
8 SHEETS—SHEET 6.

Witnesses:
H. H. Knight
F. M. Ryan

Inventor
Henry Robinson
By his Attorneys

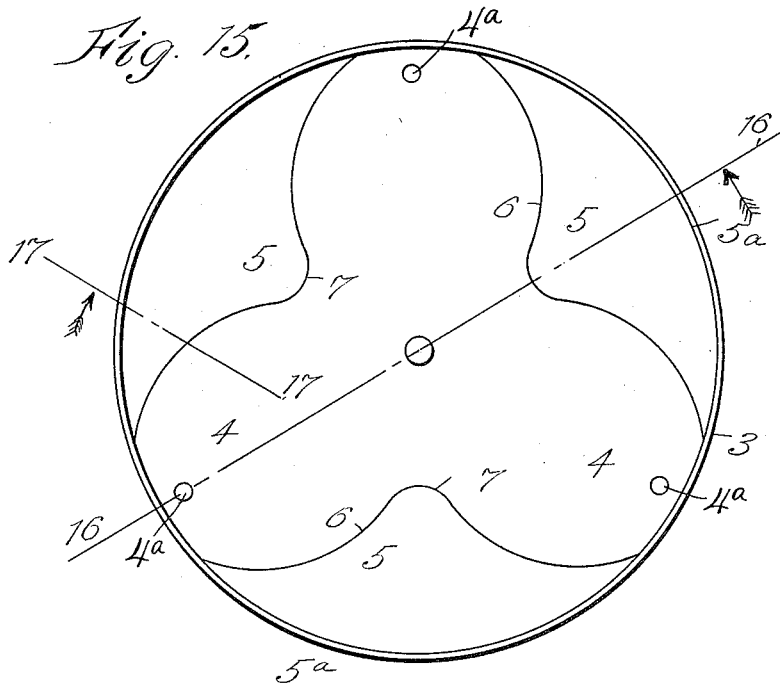
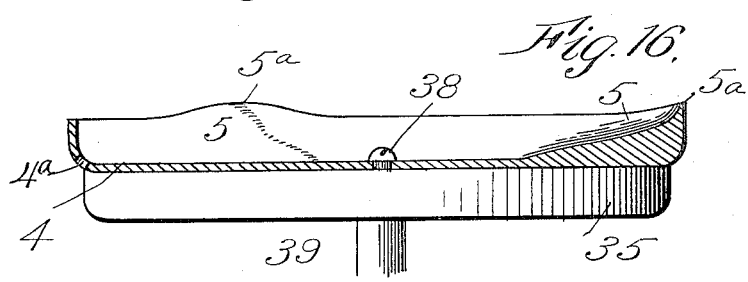
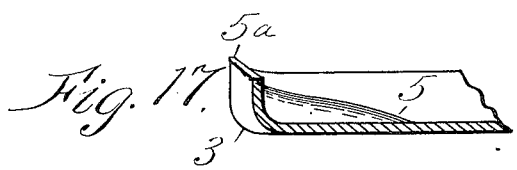

H. ROBINSON.
VEGETABLE PARING MACHINE.
APPLICATION FILED NOV. 12, 1908.
942,932.
Patented Dec. 14, 1909.
8 SHEETS—SHEET 8.
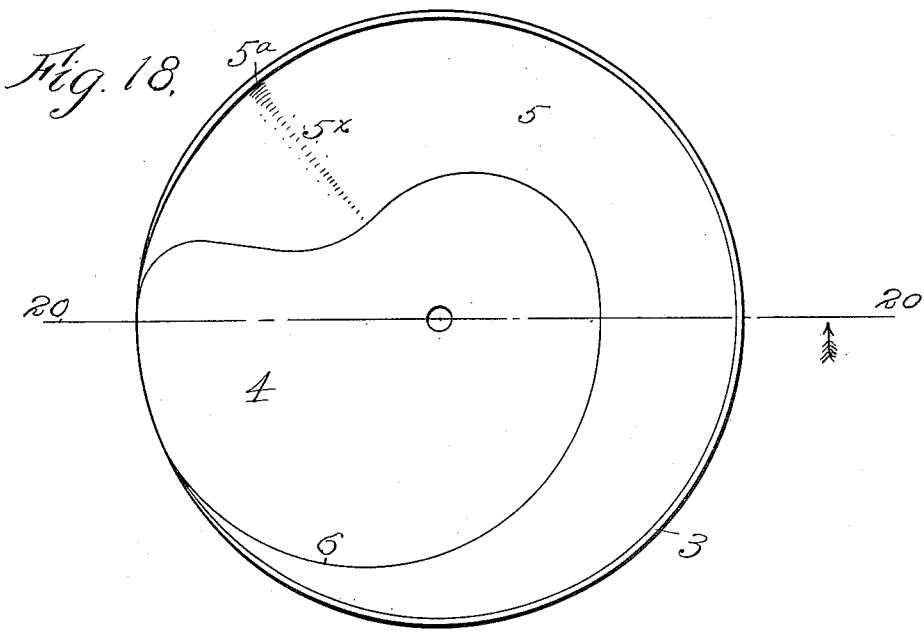
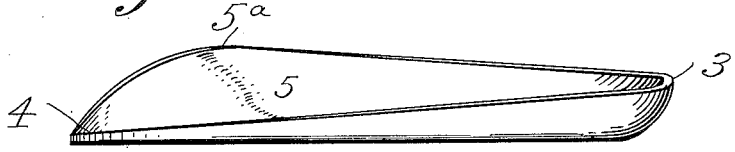
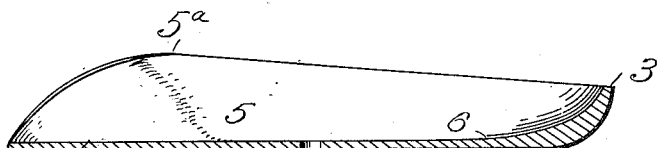
Witnesses:
Inventor
Henry Robinson
By his Attorneys

UNITED STATES PATENT OFFICE.

HENRY ROBINSON, OF NEWARK, NEW JERSEY.

VEGETABLE-PARING MACHINE.

942,932.  Specification of Letters Patent.  Patented Dec. 14, 1909.

Application filed November 12, 1908. Serial No. 462,286.

*To all whom it may concern:*

Be it known that I, HENRY ROBINSON, a citizen of the United States of America, residing at Newark, in the county of Essex and State of New Jersey, have invented certain new and useful Improvements in Vegetable-Paring Machines, of which the following is a full and clear specification.

My invention relates to that type of machines for paring vegetables (potatoes more particularly) in which the vegetables are placed in a container and subjected to an abrading action by imparting to the vegetables a motion which tosses them individually against an abradant surface and maintains their constant rotation and interplay throughout the mass, until the peel is all or substantially all removed. It is important that the rotation and interplay of the vegetables be maintained. The removing of the peel should be by a nibbling or pecking action, rather than by a direct abrading or filing, which would tend to create flat surfaces, removing the peel too much in certain places and producing a shape of the vegetable which will interfere with its rotation, and therefore with the successful bringing of all of its contour against the abradant surface. These machines are, furthermore, not handled by high priced labor and it is important that they be simple, strong, of few parts, easily cleaned and not liable to get out of order. Provision has to be made for a constant supply of water, which, projected over the vegetables while in motion, carries away the surface particles as they are removed. The machine is also to be adapted to and capable of use with various kinds of power, without substantial alteration of its essential elements. It is important that the driving mechanism, particularly where electric power is used, be thoroughly protected from the water employed in cleaning up the machine. All of these objects are had in view with others which will be apparent in the designing of my improvements in vegetable paring machines, which I will now proceed to describe, reference to be made to the claims for the more particular pointing out of the novel points.

Figure 3:
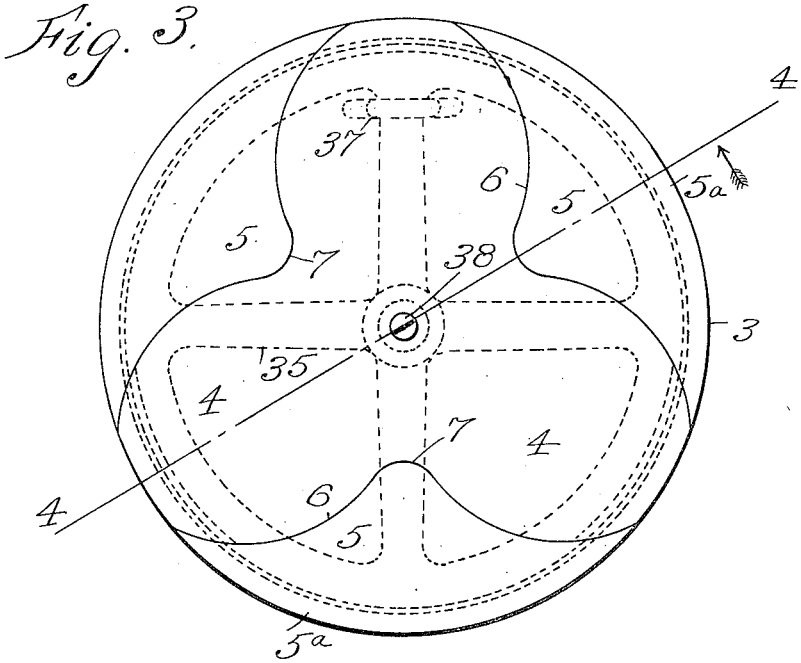
Figure 4:
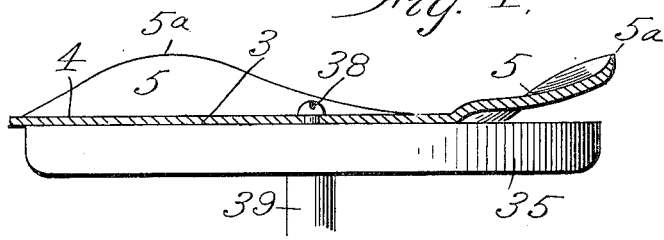
Figure 14:
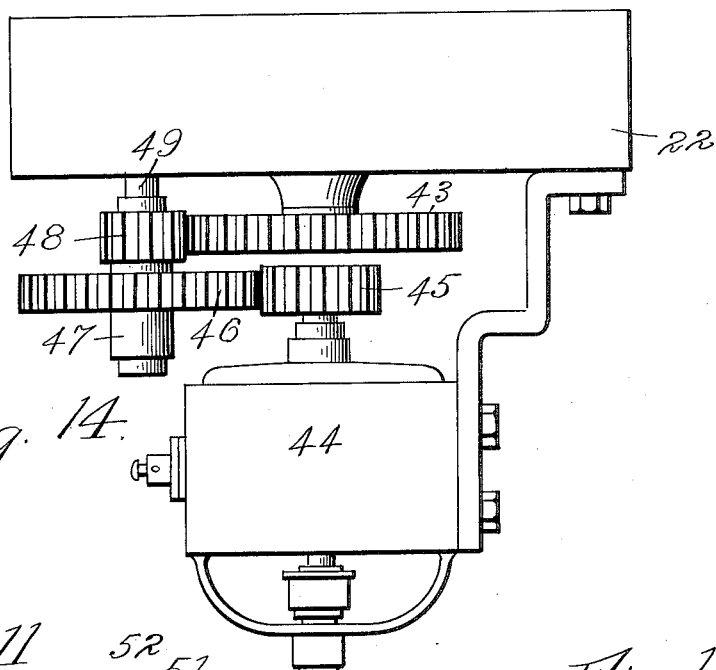
Figure 11:
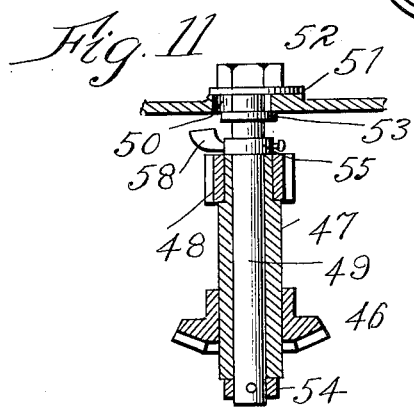
Figure 12:
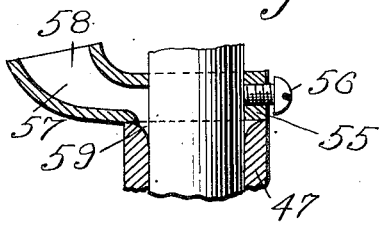
Figure 13:
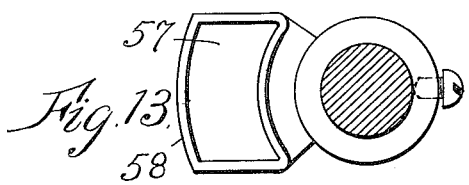

Figure 1 is front elevation of the machine, the lower portion of the legs being broken away. Fig. 2 is a sectional elevation, the view being taken in the same direction as Fig. 1. Fig. 2ª is a horizontal sectional view of the side of the container remote from the door. Fig. 3 is a plan view of the abrading disk. Fig. 4 is an elevation of the same, the abrading member being shown in vertical section on the line 4—4 of Fig. 3. Fig. 5 is a partial plan view of the lid and water connection. Fig. 6 is a partly sectional elevation of the members shown in Fig. 5, and a portion of the upper edge of the vegetable container. Fig. 7 is a rear view of the water supplying nozzle. Fig. 8 is a side elevation of the same. Fig. 9 is a sectional plan taken at the door of the container and illustrating the chute. Fig. 9ª is a sectional detail view showing the relation of the lip beneath the door opening over the chute. Fig. 10 is a horizontal sectional view taken on line 10—10 of Fig. 2. Fig. 11 is a sectional elevation of a part of the driving mechanism. Fig. 12 is a similar view to an enlarged scale, Fig. 13 is a plan view of a portion of this mechanism. Fig. 14 is an elevation showing a means for supporting and driving the mechanism when a vertical motor is used. Fig. 15 is a plan view. Fig. 16 a transverse sectional view on the line 16—16 of Fig. 15, and Fig. 17 a detail sectional view on the line 17—17 of Fig. 15 illustrating the preferred form of abrading disk or bottom plate. Fig. 18 is a plan view of the disk shown in Fig. 17. Fig. 19 a side elevation, and Fig. 20 a diametric section on the line 20—20, Fig. 18, illustrating another modification of the form of the rotating bottom plate.

The chamber for the vegetables to be pared comprises a container 1, preferably cylindrical in shape, its lid 2 and a rotating bottom 3, all of cast iron and of considerable solidity. In certain prior machines of this class, the inner wall of the container 1 and the upper surface of the rotating bottom 3 have been made ribbed or ridged. The vegetables being charged into the container and on to the rotating bottom 3 and the latter set in rotation, the vegetables are given a violent motion, tossing against the side walls of the container and dropping down on to the bottom 3, until by a constant and rapid succession of small abrading actions, the peel is removed. When the abrading action of ribbed surfaces of the container and rotating bottom is depended upon, I have found that these ribs, formed in the cast iron of the container and bottom, are rapidly worn smooth and lose their effectiveness. They are difficult to resharpen, and when considerably worn can only be replaced by the substitution of new parts. Furthermore the large knife edges of the ribs, when sharp, were apt to cut too deeply into the vegetables and the exposed iron surface, when attacked by the acid of the potato, became black and was apt to blacken the potato. I therefore, now form the abradant surface by coating the inner walls of the container 1 and the upper surface of the rotating bottom 3 with carborundum in granular condition. This is attached to the said surfaces by applying it to the cast iron with the latter in molten condition, so as to thoroughly attach the carborundum particles to the metal, which then forms, over the entire surface, an exceedingly durable and effective abradant, presenting an even series of sharp hard edges to act upon the surface of the vegetables. Such an abradant surface is practically incapable of dulling under ordinary conditions of use. It is not attacked by acid of the vegetables and the cutting surfaces are sufficiently shallow to give just the right depth of nibbling or pecking action, giving to the peeled vegetables a peculiarly attractive, smooth and white surface. The container is cast in sections preferably with flanges 2ª, cemented and bolted together and the carborundum abradant surface is applied in the mold, the metal being flowed in in very fluid condition and taking up the carborundum particles and incorporating them in the surface of the metal.

The tendency of the motion of the vegetables is to throw them outward against the wall of the container and it is important that any tendency of the individual vegetables to rest against the wall, and move along it without rotation, be counteracted by interposing means for constantly throwing the vegetables away from the wall. In prior patents, Nos. 755,481 and 809,582, I have shown the abrading ribs so inclined as to have this centripetal action upon the vegetables, but where, instead of a ribbed, a broken un-striated abrading surface is used, such as is provided by the employment of carborundum or the like, other means have to be employed. In the earlier patent referred to, I have provided humps or waves upon the revolving bottom, which have a tendency to disturb the vegetables and prevent their traveling around the container in the same horizontal plane. I have now modified the shape of these humps or waves, so as to give them in addition the effect of throwing the vegetables away from the container wall. As seen in the top view (Fig. 3) the rotating bottom 3 has the interior portion 4 flat or substantially flat, while the outer periphery of the member has provided upon it one or more circumferentially arranged waves 5, preferably of the form shown in Figs. 2, 3 and 4. With the large-size style of machine shown, preferably three circumferentially arranged waves are used. These circumferentially arranged waves are highest at their center and on the periphery of the revolving bottom; and the advancing and retiring faces 6, where the waves join the main plane of the bottom, instead of being radial are struck in a double curve which cuts the median line of the wave at a point 7 intermediate of the center and periphery of the bottom plate. While preferably curved substantially as shown, other curves may be used and this line may even be straight so long as substantially the effect here shown is produced, which is to provide adjacent to the periphery of the bottom plate one or a series of waves having their peripheral ends widely separated, and cutting the general plane or surface of the bottom by a line or lines which intersect the median line of the wave at a point intermediate of the center and periphery of the revolving bottom plate. Such waves act with a scooping effect upon the vegetables, throwing them inward toward the center, while they raise them above the general plane of the bottom and revolve them. It is also an important point in the construction of my improved waves, that the upper surface thereof has substantially the contour shown at the right hand end of Fig. 4, the said surface rising sharply near the periphery so as to interpose a lip 5ª adjacent to the wall of the container, which prevents the potato from having a pocket to lodge in, in the angle between the bottom plate and the container wall. With such construction the potato drops away from the wall and down on to the plate and is positively thrown away from the periphery instead of lodging in an angular pocket between the two members, and being drawn along by the plate and in contact with the abrading surface of the container wall. Even if it lodges in the space or dip in the plate below the lip, and is momentarily prevented from dislodgment by the pressure of superincumbent vegetables, it will be carried along in contact only with one abrading member and is not injuriously ground. To still further carry out this operation of positively removing the vegetables from the container wall, I preferably carry the lip 5ª beyond the wave portions, extending it all around the bottom plate, so as to create of the latter the somewhat bowl-like structure shown in Figs. 15, 16 and 17. A continuous lip such as here shown, not only holds the bottom-most layer of vegetables away from the container wall at the upper part of the waves, but it prevents the accumulation of vegetables at the advancing side of the waves adjacent to the container wall, which would tend to cause the vegetables to be held against the said wall by that portion of the rotating member. I have found that this form of bottom member tends to keep the vegetables in more constant movement, and to produce a more even abrading action and also that owing to the removal of points of excessive resistance, it is easier to start the machine and to maintain its operation when this form is used. The bowl-shaped bottom plate here shown is preferably provided with holes $4^a$ of any desired number, to drain it when at rest. Still further carrying out the idea of a scooping action on the vegetables, I have illustrated in Figs. 18, 19 and 20 a further modification in which a single wave 5 is used, extended nearly all around the bottom plate, having its peak at $5^x$ and its advancing edge 6 tapered to a thin wedge as shown. In this portion also the lip $5^a$ may be on the wave portion only, or be extended completely around the plate.

A further device that I may employ for compelling the flow of vegetables toward the center of the container is a scoop-shaped lug $1^a$ formed on or affixed to the wall of the container, (see Fig. $2^a$) preferably immediately opposite the door opening therein, projecting in a curved line in the direction of motion of the vegetables and incurved toward the center of the container. Its surface, or the part thereof subjected to the impact of the vegetables, is, as shown, smooth, or may be covered with the same abradant material as the rest of the container wall. Such a lug acts not only centripetally on the vegetables, preventing clogging of the latter against the container wall, but, arranged as here described immediately opposite the discharge door, serves to positively direct the vegetables through the door opening, when the door is opened—the rotating motion of the bottom being maintained. Preferably, as shown, the lug $1^a$ is hinged at $1^b$ to the side wall of the container and adapted to automatically reverse its position from side to side when the direction of rotation of the bottom plate is reversed so as to always offer to the advancing mass of vegetables the surface of the lug having the proper scoop-like form.

The lid 2 has, as shown in Figs. 5 and 6, an axially disposed chamber 8, the walls of which are prolonged as shown at 9 to provide butts for arresting the lid when open, in which position the butts 9 impinge upon the outer wall of the container 1. The members 9 also have cheek portions 10 to receive the hinge pin 11 whereby the lid is hinged to the container. Water connection is made by a pipe 12, under control of a valve 13, to a nozzle or plug 14, which has jaws 15 adapted to engage the edge of the container and to be set thereto by set screw or butterfly nut 16. The plug 14 has the cylindrical barrel portion $15^a$ with which the cheek pieces 10 engage, and is prolonged into the chamber 8 under the lid in the form of a nozzle provided with openings 17 through which water is sprayed upon the vegetables in the container. Springs 18 lie along under the lid and in contact with the under surface thereof, pass through cut-away portions 19 in the ends of the barrel portion $15^a$ of the plug and have one or more turns in the chamber 20 in the ends of such plug before being fixed to the part $15^a$ of the latter at 21. These springs serve as a means of counter-weighting the lid. The plug just described serves, therefore, as a support for the lid counterweight, a means of water connection and a hinge support for the lid which may be set at any desired position. In this way the construction of the lid is simplified and the number of breaks in its continuity diminish to one.

The container 1 sets at the bottom upon the periphery of a stationary pan 22 and the inner surface of the container is extended down within the pan in the form of a lip 23 to prevent the water from passing out at this point. The container has in front the hinged door 24 having suitable means for firmly securing it in closed position against the wall of the container. Immediately under the door opening and cast integral with the container wall is a slanting lip 25 carrying beyond the container any drip passing through the door opening.

26 is a chute or trough bolted to the front of the pan and hugging close to the container under the lip 23 to insure the discharge at a point remote from the machine of vegetables and drip issuing through the door opening. The chute is shaped as shown to insure the catching of any drip from either edge of the door as well as from beneath it. It has the dipped portion 27 at the right side to permit the door to swing open and at the left side is carried up to considerable height, as shown at 28, to catch anything which may be flung out through the door opening when the door is open.

The pan 22 rests upon legs 29, preferably 3 in number, and arranged within the legs and within the outer edge of the pan 22, and protected from drip by the depending lip 30 thereof, is a casing 31, preferably of the form shown in Figs. 2 and 10. The upper edge of the casing 31 fits snugly against the under surface of the pan and is vertically slotted on each side at its upper edge to engage bolts 30 fixed to flat-sided flanges or lugs 33 depending from the under side of the pan 22. These bolts have butterfly nuts 34 to removably fasten the casing in position. As will be seen the casing is formed to completely surround all of the motor and operating mechanism. The lip 30 is broadened at 30ª Fig. 10 to afford bearing for the flanged upper ends of legs 29.

The rotating bottom 3 is carried by spider 35, weighted peripherally so that it serves as a fly wheel, and having a peripheral lip 36 on its upper surface to engage corresponding lips or lugs on the under surface of the rotating bottom 3. Said bottom has also one or more pairs of depending lugs or jaws 37 to engage one or more of the spokes of the spider 35 to insure corotation of the spider and the bottom. The bottom is fixed to the spider by central screw bolt 38, and the spider is keyed or otherwise firmly attached to the shaft 39 and rests by its hub 40 on a ball bearing 41 carried by the central hub or boss 42 of the pan 22. The lower end of the shaft 39 carries a gear wheel 43 which receives motion from the electric motor or other driving power 44 through bevel gears 45, 46, sleeve 47 and pinion 48. For different heights of motors, the bevel gear 46 may be adjusted on sleeve 47. The bevel wheel 46 and pinion 48 are rigidly secured to the sleeve 47 and turn with it upon a bearing pin 49. The construction of these elements clearly appears from Figs. 2 and 11. It will be seen that the pin 49 passes through radial slot 50 in the bottom of pan 22, which slot is covered by the elliptical flat washer 51. On loosening the nut 52 the pin can be adjusted radially. The nut may then be tightened clamping collar 53 to the bottom of the pan 22 at the desired position and holding the bearing of the sleeve 47 at the correct distance from the driving shaft 39. The sleeve 47 is supported at the bottom by keyed or bolted collar 54 and is held from vertical movement by the ported collar 55 held by set screw 56, see Figs. 12 and 13. This collar is provided with port 57 and flaring mouth 58 to permit the supply of oil to the bearing of the sleeve 47 on pin 49, and the inner upper edge of the sleeve is rounded out as shown at 59 to permit the access of the oil to said bearing.

60 is a discharge pipe for the wash water and its contained dirt and peel fragments, bolted by its flange 61 around the opening 62 to the bottom of the pan 22. The motor is bolted to the under side of the plate or table 63 which in turn is bolted to lugs 64 dependent from the under side of the pan 22, and is adjustable longitudinally of its shaft on said plate 63 by means of a series of bolt holes or by slot and pin, or it may be adjustable with the plate 63 by providing slots in said plate to permit the passage of the bolts which connect it to the lugs 64. By means of the adjustment provided by the pin and slot connection of the sleeve bearing 47 with the pan, and the adjustment provided for the motor upon or with its supporting plate, it is easy to adapt the transmitting mechanism to motors of different makes and sizes.

In Fig. 14 the arrangement is shown which may be used when a vertical motor is employed, and which will be understood without further description.

While I have shown the preferred construction of my machine, I do not wish to be limited in all parts to the precise construction shown, and parts of it may be changed while adhering to the construction here shown of other parts.

Certain parts of my invention are susceptible of use with other means of drive than by electric motors, as for example by belt and pulley or by a handle as has been illustrated in prior patents granted to me. For economy of space and protection of the moving parts, as well as to protect ignorant operators from injury, it is best in all cases to mount the driving mechanism, so far as possible, under the pan and to protect it from drip by the pan as well as by the lip and casing above described. This construction is particularly important where an electric motor is used, because the ignorant users of these machines in throwing cleaning water over the machine from a hose are apt to destroy the motor, unless it is thoroughly protected.

What I claim is—

1. In mechanism of the character described, a rotary horizontal abradant member having a substantially flat abradant surface of broken crystalline material the surface being broken with a plurality of peripheral scoop-shaped humps or waves, said waves extending outwardly from a point intermediate of the center and periphery of the member.

2. In a machine of the character described, a rotary abrading member having a substantially flat surface and an upwardly projecting concave peripheral lip.

3. In a mechanism of the character described, the combination of a container, a water supply plug, means whereby water is supplied thereto, a barrel integral with said plug and a lid having a recessed portion to receive said plug and cheek pieces to receive said barrel between them, said cheek pieces pivotally attached to said barrel.

4. In a mechanism of the character described, the combination of a container, a water supply plug, means whereby water is supplied thereto, a barrel integral with said plug and a lid having a recessed portion to receive said plug and cheek pieces to receive said barrel between them, said cheek pieces pivotally attached to said barrel, and two jaws integral with said plug to receive the edge of the container between them for attaching the plug at any place at the edge of the container.

5. In mechanism of the character described, a water supply plug having means whereby a lid is hinged thereto, and a counterweighting spring for said lid, bearing with one end against said lid and with the other end against said plug.

6. In mechanism of the character described, the combination of a water supply plug having a cylindrical barrel 15 chambered at 20, a hinge pin 11, counterweighting springs 18, bearing with one end against said lid and with the other end against said plug, a lid 2 having cheek pieces 10, and means for attaching said plug to the edge of the vessel.

7. In mechanism of the character described, the combination of a container having a door opening, a downwardly directed lip beneath said opening integral with the container, and a chute or trough rigidly attached to said container beneath said lip.

8. In a mechanism of the character described, the combination of a pan, a rotary abradant member, driving mechanism therefor attached beneath the pan, a detachable casing surrounding said driving mechanism, and a dependent lip on the pan surrounding the upper edge of said casing.

9. In mechanism of the character described, the combination with the pan, the rotary abradant member supported thereon, a driving shaft for said member comprising a drive sleeve and a supporting pin for said sleeve radially adjustable disposed on said pan, and a motor for driving said shaft.

10. In mechanism of the character described, the combination of a rotary abradant member, its drive shaft and motor, a drive sleeve interposed in the driving mechanism, between said motor and shaft, and a supporting pin for said sleeve having adjustable support.

11. In mechanism of the character described, the combination with the pan, the rotary abradant member supported thereon, a driving shaft for said member, a motor for driving said shaft, and intermediate driving gear radially adjustable on said pan, said intermediate gearing comprising a bearing pin, a driving sleeve and a ported washer having means of attachment to said pin.

12. In mechanism of the character described, the combination with the pan, the rotary abradant member supported thereon, a driving shaft for said member, a motor for driving said shaft, and intermediate driving gear, said pan having a slot, said gear radially adjustable on said pan in said slot, said intermediate gearing comprising a bearing pin, a driving sleeve and a ported washer having means of attachment to said pin, and means for holding said pin in adjusted position in said slot.

13. In mechanism of the character described, the combination with a pan, a rotary abradant member supported thereon, a driving shaft for said member, a pan having a central bearing for said shaft and a radial slot, a bearing pin adjustable in said slot adapted to hold intermediate driving mechanism and an oblong covering plate or washer surrounding said pin and covering said slot and means for holding said pin in adjustable position in said slot.

14. In mechanism of the character described, the combination with a pan, a rotary abradant member supported thereon, a driving shaft for said member, a pan having a central bearing for said shaft and a radial slot, a bearing pin adjustable in said slot, an intermediate driving mechanism on said pin, a motor connected to said driving mechanism and a carrying plate or table for said motor below said driving mechanism and bolted to said pan.

15. In mechanism of the character described, the combination with a pan, a rotary abradant member supported thereon, a driving shaft for said member, a pan having a central bearing for said shaft and a radial slot, a bearing pin adjustable in said slot, an intermediate driving mechanism on said pin, a motor connected to said driving mechanism, a carrying plate for supporting said motor below said mechanism, said pan having dependent lugs to which said plate is attached.

16. In a mechanism of the character described, the combination with the pan, the rotary abradant member supported thereon, a driving shaft for said member, a motor for driving said shaft, and intermediate driving gear radially adjustable on said pan, said intermediate gearing comprising a bearing pin, a power transmitting sleeve rotatably supported in said pin and having a rounded inner upper edge, and a ported collar on said pin having its port discharge within said sleeve.

17. In mechanism of the character described, the combination with the pan, the rotary abradant member supported thereon, a driving shaft for said member, a motor for driving said shaft, and intermediate driving gear radially adjustable on said pan, said intermediate gearing comprising a bearing pin, a power transmitting sleeve on said pin, a collar adjustably secured to said pin above said sleeve, and having a lubricating port and a flaring mouth.

18. In a machine of the character described, a container having a cylindrical wall provided with a scoop-shaped lug in combination with a rotating abrading member, said lug overhanging the rotating abrading member.

19. In a machine of the character described, a container having a cylindrical wall, an abradant member of substantially disk form, forming the bottom of said container, said disk member having a plurality of peripheral scoop-shaped humps or waves operative upon rotation of the disk in either direction and having an up-turned peripheral lip, said container provided with a reversible scoop-shaped lug, said lug being pivotally attached to said wall to yield in either direction according to the direction of the rotation of the objects in said container.

20. In a machine of the character described, a container having a cylindrical wall, an abradant member of substantially disk form, forming the bottom of said container, said disk member having a plurality of peripheral scoop-shaped humps or waves operative upon rotation of the disk in either direction and having an up-turned peripheral lip, said container provided with an automatically reversible scooped shaped lug, said lug being pivotally attached to said wall to yield in either direction according to the direction of the rotation of the objects in said container.

HENRY ROBINSON.

Witnesses:
H. H. KNIGHT,
LAURA E. MONK.